US006436483B2

(12) United States Patent
Palmasi et al.

(10) Patent No.: US 6,436,483 B2
(45) Date of Patent: Aug. 20, 2002

(54) METHOD OF MANUFACTURING TAMPER EVIDENT HOLOGRAPHIC DEVICES

(75) Inventors: Miklos Palmasi, Clinton Corners; Anh Nguyen, Hastings-on-Hudson, both of NY (US); Kang Lee, Woodlands Hills, CA (US); Lily O'Boyle, Peekskill, NY (US)

(73) Assignee: American Bank Note Holographics, Inc., Elmsford, NY (US)

( * ) Notice: Subject to any disclaimer, the term of this patent is extended or adjusted under 35 U.S.C. 154(b) by 45 days.

(21) Appl. No.: 09/769,053

(22) Filed: Jan. 25, 2001

Related U.S. Application Data

(62) Division of application No. 09/327,993, filed on Jun. 8, 1999, now Pat. No. 6,214,443.
(60) Provisional application No. 60/089,324, filed on Jun. 15, 1998.

(51) Int. Cl.[7] .................................................. C08J 7/04
(52) U.S. Cl. ...................... 427/510; 264/1.34; 264/1.38; 264/1.9; 264/129; 264/483; 264/494; 427/162; 427/207.1; 427/210; 427/265; 427/407.1; 427/533; 427/558; 427/559
(58) Field of Search ............................... 264/1.34, 1.38, 264/1.9, 129, 483, 494; 427/510, 162, 207.1, 210, 265, 407.1, 533, 558, 559

(56) References Cited

U.S. PATENT DOCUMENTS

| | | | | |
|---|---|---|---|---|
| 4,913,504 | A | | 4/1990 | Gallagher |
| 5,145,212 | A | | 9/1992 | Mallik |
| 5,319,475 | A | | 6/1994 | Kay et al. |
| 5,347,111 | A | | 9/1994 | Hoshino |
| 5,492,370 | A | | 2/1996 | Chatwin et al. |
| 5,513,019 | A | | 4/1996 | Cueli |
| 5,658,411 | A | * | 8/1997 | Faykish |
| 5,683,774 | A | * | 11/1997 | Faykish et al. |

FOREIGN PATENT DOCUMENTS

| | | |
|---|---|---|
| GB | 2027441 | 2/1980 |
| GB | 2136352 | 9/1984 |
| GB | 2211760 | 7/1989 |

* cited by examiner

*Primary Examiner*—Bernard Pianalto
(74) *Attorney, Agent, or Firm*—Cooper & Dunham LLP

(57) ABSTRACT

A method for producing a tamper evident security holographic label and overlaminate using UV casting techniques, and a security device so produced, comprising a clear protective layer; a thin layer of clear UV cured resin cast partly onto the protective layer following a designed pattern; another layer of UV cured resin bearing a cast holographic image, wherein the bond of the holographic image layer is stronger toward the surface of the protective layer than it is toward the surface of the pattern layer; a reflective layer strongly attached to the adjacent holographic layer; and an adhesive layer bonded to the reflective layer. Such a composite product when adhered to a base substrate via the adhesive layer will show no visible security feature to the unaided eye due to the thin nature of the clear security pattern. But upon delamination attempts, the ultra-thin holographic image layer will be broken at the weakest interfacial bond which is between the two UV cured resin surfaces, providing visible evidence of tampering in the form of a break pattern identical to that of the clear pattern layer.

2 Claims, 1 Drawing Sheet

METHOD OF MANUFACTURING TAMPER EVIDENT HOLOGRAPHIC DEVICES

CROSS REFERENCE TO RELATED APPLICATION

This application is a division of applicants' U.S. patent application Ser. No. 09/327,993, filed Jun. 8, 1999, now U.S. Pat. No. 6,214,443, which claims the priority benefit under 35 U.S.C. §119(e) of applicants' U.S. provisional patent application No. 60/089,324 filed Jun. 15, 1998.

BACKGROUND OF THE INVENTION

This invention relates to security devices bearing holographic images, of the type commonly applied to personal identification cards, various types of documents or other substrates, and to methods of making such devices.

As described for example in U.S. Pat. Nos. 5,145,212 and 4,913,504, to protect a credit card or other article or document of value against counterfeiting, a label or like device bearing a relief holographic image may be applied thereto. Holographic images are inherently extremely difficult to replicate effectively; moreover, in the described security device, the relief image is cast on a surface facing the substrate, so as to be inaccessible for taking impressions. Owing to this combination of characteristics, devices of the type described have won very wide acceptance.

Notwithstanding the success of such known holographic image-bearing security devices, it would be desirable to provide enhanced or additional security features in these devices, and to do so in a simple and economical manner, preferably capable of implementation with a minimum of modification in existing types of production lines.

SUMMARY OF THE INVENTION

An object of the present invention is to provide holographic image-bearing security devices, e.g. labels, for application to cards, documents and/or other substrates, characterized by a new and improved feature for making attempted tampering evident. Another object is to provide tamper evident security labels or overlaminates which combine both a readily verifiable overt security feature through the use of a holographic image and a covert security feature through the use of an invisible pattern that only becomes evident upon an attempt to delaminate the device from the surface to which it is adhered.

A further object is to provide a relatively simple and cost effective method of making tamper evident security devices of the type bearing holographic images. A still further object is to provide such a method of mass producing tamper evident holographic security products by radiation casting techniques.

To these and other ends, the present invention in a first aspect broadly contemplates the provision of a security tamper evident holographic label or like device affixable to a substrate such as a card, document or other article. The security device of the invention comprises a clear protective layer having opposed surfaces; a thin patterned layer of a clear resin cast onto a surface of the protective layer in a pattern such that some portions of that protective layer surface are covered, and other portions are not covered, by the patterned layer; a holographic image layer of a resin bearing a holographic image and having opposed surfaces of which one faces toward, and is bonded to, the patterned layer and portions of the protective layer surface that are not covered by the patterned layer, the bond of the image layer to the not-covered portions of the protective layer surface being stronger than the bond of the image layer to the patterned layer; a reflective layer strongly attached to the image layer; and an adhesive layer, bonded to the reflective layer, for affixing the device to a substrate.

This article, when adhered to a identification card or other base substrate by the adhesive layer, will exhibit no discernible security feature to the unaided eye owing to the thinness of the clear security patterned layer. If delamination of the article is attempted, however, the holographic image layer will be broken at the weakest interfacial bond, which is between the patterned layer and image layer surfaces, making evidence of tampering visible in the form of a break pattern identical to that of the clear patterned layer.

As an important particular feature of the invention, for achieving the foregoing and other advantages, both the patterned layer and the holographic image layer of the device are constituted of ultraviolet cured resin. The patterned layer and the image layer can be made of the same type of ultraviolet cured resin, or can be made of exactly the same resin.

In a second aspect, the invention contemplates the provision of a method for making a security device as described above, including the steps of providing a clear protective layer having opposed surfaces; radiation casting, on one of the surfaces of the protective layer, a thin patterned layer of a clear radiation curable resin, the patterned layer being cast onto the protective layer in a pattern such that some portions of the protective layer are covered, and other portions are not covered, by the patterned layer; radiation casting a second layer of a clear radiation curable resin bearing a holographic image onto the patterned layer and portions of the protective layer that are not covered by the patterned layer, the materials of the protective layer, patterned layer and second radiation curable resin layer being such that the last-mentioned layer bonds more strongly to the not-covered portions of the protective layer surface than to the patterned layer; strongly attaching a reflective layer to the last-mentioned image layer; and bonding an adhesive layer to the reflective layer, for affixing the device to a substrate. The protective layer and the patterned layer are subjected to a corona treatment before the holographic image layer is cast thereover.

Further features and advantages of the invention will be apparent from the detailed description hereinbelow set forth, together with the accompanying drawing.

DETAILED DESCRIPTION

Figure 1:
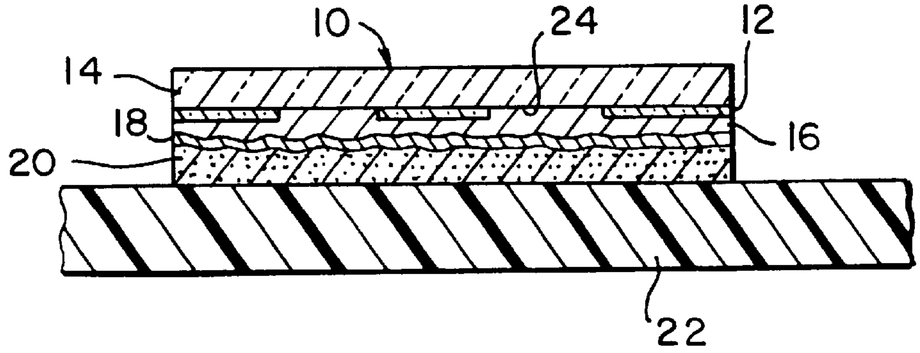
FIG. 1 is a schematic side elevational sectional view, not to scale, of a security label embodying the present invention in a particular form, attached to a substrate such as a personal identification card, in untampered condition.
Figure 2:
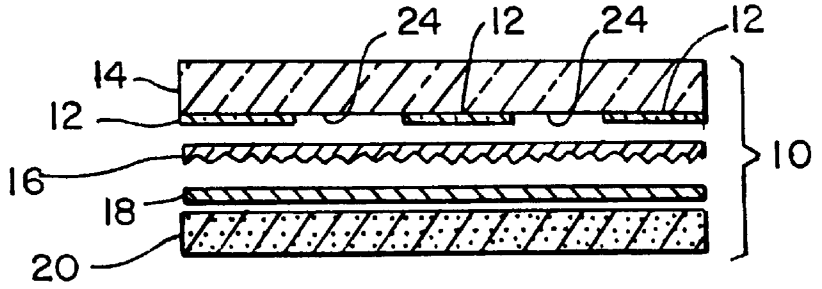
FIG. 2 is a similar but exploded view of the security label of FIG. 1, again shown in untampered condition.

Referring to the drawing, and in particular to FIGS. 1 and 2 thereof, the security label 10 there shown has a clear radiation cured patterned layer 12 cast "partly" (in a designed pattern) onto a surface of a clear protective layer 14, another clear radiation cured layer 16 bearing a cast holographic image, a reflective layer 18, and an adhesive layer 20 for securing the label to a substrate such as a card, document or other article 22. The pattern of layer 12 is such that some portions of the surface of layer 14 are covered by the material of layer 12 and other portions are not. The direct bond between the holographic image layer 16 and the protective layer 14 (i.e. in protective layer surface portions 24 where the protective layer surface is left exposed by patterned layer 12) is stronger than that between layer 16 and the patterned layer 12, so that attempted delamination will break the holographic image layer at the weakest interfacial bond, to form a break pattern identical to the pattern of layer 12.

Typically the cast holographic image is a relief holographic image as described in the aforementioned U.S. Pat. Nos. 5,145,212 and 4,913,504, and is cast in the surface of layer 16 facing away from layers 12 and 14, the reflective layer 18 being formed thereafter by vapor deposition or sputtering of aluminum or other highly reflective materials over this cast surface (again as set forth in the last-mentioned patents) prior to application of the adhesive layer 20.

As thus embodied, important particular features of the invention reside in the provision of a clear patterned layer between a clear protective layer and a holographic image layer to provide a differential adhesion pattern at that location. The patterned layer 12 is sufficiently thin so as to be undetectable (in the untampered label) upon visual inspection.

In the illustrated embodiment of the invention, the bond strength between the image layer 16 and the exposed (unpatterned) portions 24 of the surface of protective layer 14 is greater than the shear strength of the image layer 16 and the reflective layer 18; the bond strength between the adhesive layer 20 and the reflective layer 18 is also greater than the shear strength of the image layer 16 and the reflective layer 18; the bond strength between the image layer 16 and the exposed (unpatterned) portions of the surface of protective layer 14 is greater than the bond strength between the adhesive layer 20 and the reflective layer 18; and the shear strength of the protective layer 14 is greater than the shear strength of the image layer 16 and the reflective layer 18.

In a typical holographic label or overlaminate using radiation casting techniques, the product can be viewed as a two-layer system comprising a clear protective layer and a much thinner holographic layer cast directly onto the protective layer. The holographic image is subsequently made more visible by coating the holographic image side of the label with an ultra thin layer of reflective material. An adhesive layer is finally applied to the reflective side of the label to render the entire system functional as a pressure sensitive holographic label or a holographic overlaminate product. The present invention achieves the objective of adding a covert security feature, to the typical construction just described, in the form of a tamper evident pattern that remains invisible until the product has been tampered with.

In its method aspects, the invention achieves the further objective of adding the covert security feature in an efficient and cost effective manner during the mass production of the security device. To this end, two simple but very effective additional operational steps are introduced just prior to the casting of the holographic image layer 16 onto the protective layer 14 and the pattern layer 12. These steps comprise first casting directly onto the clear protective layer 14 a very thin and clear patterned layer 12 that partly covers the protective layer, following by subjecting the resulting two-layered film to corona treatment. The patterned layer is a clear UV-curable liquid resin that bears no image and is chosen to exhibit practically the same or similar refractive index to that of the clear polymeric protective layer so that it will remain invisible to the unaided eye in the final construction. Preferably, this patterned layer is chosen to bond strongly to the protective layer.

The pattern design of layer 12 on layer 14 can assume a variety of forms and shapes, from the common checkerboard pattern to a number of designed graphics, indicia, text or the like. As will be understood, the pattern is constituted of areas in which the patterned layer is present (covering portions of the protective layer surface) and areas in which the patterned layer is absent (leaving other portions 24 of the protective layer surface exposed for direct bonding to the subsequently cast image layer 16).

After the UV casting of the patterned layer and the corona treatment of both the protective and patterned layers, the holographic image layer 16 is cast directly over the patterned layer and the protective layer. The holographic image layer is a UV curable resin made of the same type of resin as that of the patterned layer or is made of exactly the same resin as the patterned layer. The image layer is of the same order of thickness as that of a typical UV cast hologram but must fully cover the protective layer as well as the thinner patterned surface so that the final holographic image that becomes visible due to the subsequent addition of an ultra thin coating of a reflective material 18 will remain evenly smooth and effectively render invisible the security pattern of the patterned layer 12.

The UV curable resin used to cast the holographic image layer 16 is chosen to exhibit a sufficiently high bond strength toward the protective layer 14 to exceed the weaker bond between the corona treated patterned resin and the image resin. Corona treating the patterned layer prior to casting the image layer on top of it, regardless whether the patterned layer is made of the same resin as the image layer or not, will reduce the bond strength between the said two UV curable resin layers and consequently produces an increase in the bond strength differential between the image layer 16 and the protective layer 14 on one hand and the image layer 16 and the patterned layer 12 on the other hand. The aforesaid bond strength differential can also be further improved if, in addition to corona treatment, the bond strength between the holographic image layer 16 and the protective layer 14 is made even stronger by choosing a combination of protective layer material and holographic layer chemicals that exhibit an inherently greater bond strength among them. The latter case is particularly helpful when the final product is an overlaminate which makes use of a heat-activated adhesive instead of a pressure sensitive label.

Figure 3:
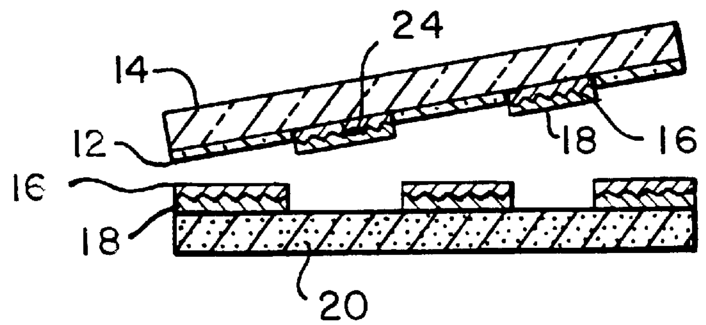
FIG. 3 is a similar view of the same label after tampering.

It is this bond strength differential that allows the final product to assume the tamper evident characteristic if tampered with. That is, when stress is applied to remove the label from the surface to which it has been attached by means of an adhesive layer 20, portions of the image layer 16 that come in direct contact with the patterned layer 12 will be readily detached from the patterned portions because of the weaker interfacial bond between the two UV cured resins. On the other hand, in areas where the image layer 16 is directly cast over the non-patterned portions 24 of the protective layer 14, the image layer will remain attached to the protective layer 14 because its bond strength towards the protective film is greater than the adhesive strength between the reflective layer 18 and the base substrate 22. Since the tear strength of the thin UV cast image layer is lower than the adhesive strength between the image layer and the base substrate, the image layer will break in the exact pattern as the patterned layer during the delamination process (as shown in FIG. 3), leaving parts of the image behind on the base substrate and other parts of it on the delaminated portion.

The simplicity of this method resides in part in the fact that it requires the addition of only one single extra casting step in the UV casting operation, i.e., for casting the patterned layer 12. It becomes even more straightforward if done in-line if the casting equipment has multiple casting stations.

Another advantage of this method from the standpoint of simplicity is that the patterned layer and the image layer can be made of exactly the same UV cured resin. This further simplifies the manufacturing of the product since there is no downtime due to cleaning between the two casting operations.

By way of illustration of suitable materials for the tamper evident device of the invention, the protective layer 14 may be a clear plastic film (available from commercial suppliers) e.g. a film of PET, polypropylene, polycarbonate, styrenic, vinyl, acetate, etc. The patterned layer 12 may be constituted of a UV curable resin based on acrylic, urethane and/or epoxy chemicals. Similarly, the holographic image layer 16 may be constituted of a UV curable resin based on acrylic, urethane and/or epoxy chemicals.

In a currently preferred combination of materials, the protective layer 14 is an optically clear, tough plastic film such as polyester, polycarbonate or polypropylene film, while a combination of acrylic and urethane-based UV curable oligomers having mono and multi-functionalities is used for the patterned layer 12 and the image layer 16. A typical or exemplary formulation for these two (patterned and holographic image) layers contains high speed UV initiator and monofunctional UV curable monomer as diluent.

An exemplary range of thickness of the patterned layer 12 is between about 0.5 microns and about 2.5 microns. A currently preferred value for this thickness is approximately 2 microns.

More particularly, in currently preferred practice, the resins (varnishes) used in the patterned and the holographic image layers are made of chemical ingredients originating from the same classes of UV curable chemicals. The common classes of UV materials generally include those in the acrylic, urethane and epoxy groups. A varnish typically contains either oligomers from the acrylic, urethane or epoxy groups or from a-mixture of the above groups of chemicals. The choice of chemicals is dictated by the substrate onto which the varnish is cast as well as its final properties. In general, there is a set of structure-property guidelines typically found in radiation curable resins. See United Kingdom published patent application No. 2,027,441-A.

The preferred method of casting the patterned layer 12 on the protective film 14 is by a combination of gravure roller and transfer roller (not shown). First the gravure roller is brought in contact with the liquid varnish while it is in a continuously rotating mode. A transfer roller on which a desired pattern has been engraved is simultaneously brought in contact with the rotating gravure cylinder. The raised patterned areas on the transfer roller become wetted with the liquid varnish. The protective film is brought in contact directly with the rolling transfer roller via a nip roller and is therefore set in a continuously advancing motion. The film becomes continuously coated with the liquid varnish in the same pattern design as the pattern design on the transfer roller. The thickness of the coated varnish is mainly related to the cell gravure cylinder, the viscosity of the liquid varnish as well as the speed of the film as it passes through the line. The liquid varnish is then cured as it passes directly under a UV light source, forming an ultra-thin patterned layer 12 of UV cured resin on top of the protective layer 14.

The casting of the holographic image layer 16 onto the newly formed double-layered film which is composed of the protective film 14 and patterned layer 12 attached to it, is very similar to the casting of the patterned layer 12. First, the double-layered film is coated with a second liquid UV varnish by gravure and transfer roller as described before. This time, the transfer roller does not have any pattern on it. The secondary liquid vanish covers the entire film surface including the patterned areas as well as the unpatterned areas of the protective film. Its preferred thickness after curing is approximately 3 to 5 microns. The coated film subsequently passes over an image cylinder with the liquid varnish facing the image grooves while it is simultaneously cured by exposure to a UV light located directly above the image cylinder. The liquid varnish is cured by the UV beam as the latter passes through the clear protective and patterned layers. In this casting process, the cured varnish retains the holographic image grooves as it replicates the grooves from the image cylinder. The final film is a three-layered film made of a protective layer, a patterned layer and a holographic image layer. Each layer is made of polymeric materials chosen to exhibit refractive index values very close to one another. As long as the image layer fully covers the ultra-thin patterned layer beneath it, it will not make the patterned layer apparent even after the hologram has been coated with a high reflective metal for ready visibility.

It is to be understood that the invention is not limited to the features and embodiments herein specifically set forth, but may be carried out in other ways without departure from its spirit.

What is claimed is:

1. A method for making a security device, including the steps of (a) providing a clear protective layer having opposed surfaces;

(b) radiation casting, on one of the surfaces of the protective layer, a thin patterned layer of a clear radiation-curable resin, the patterned layer being cast onto the protective layer in a pattern such that some portions of said one surface of said protective layer are covered, and other portions of said one surface of said protective layer are not covered, by the patterned layer;

(c) radiation casting a holographic image layer onto the patterned layer and the portions of said one surface of said protective layer that are not covered by the patterned layer, wherein the image layer bonds more strongly to the not-covered portions of the protective layer surface than to the patterned layer;

(d) strongly attaching a reflective layer to the image layer; and (e) bonding an adhesive layer to the reflective layer, for affixing the device to a substrate.

2. A method according to claim 1, including the step of subjecting the protective layer and the patterned layer to a corona treatment after step (b) and before step (c).

* * * * *